Patented Dec. 30, 1924.

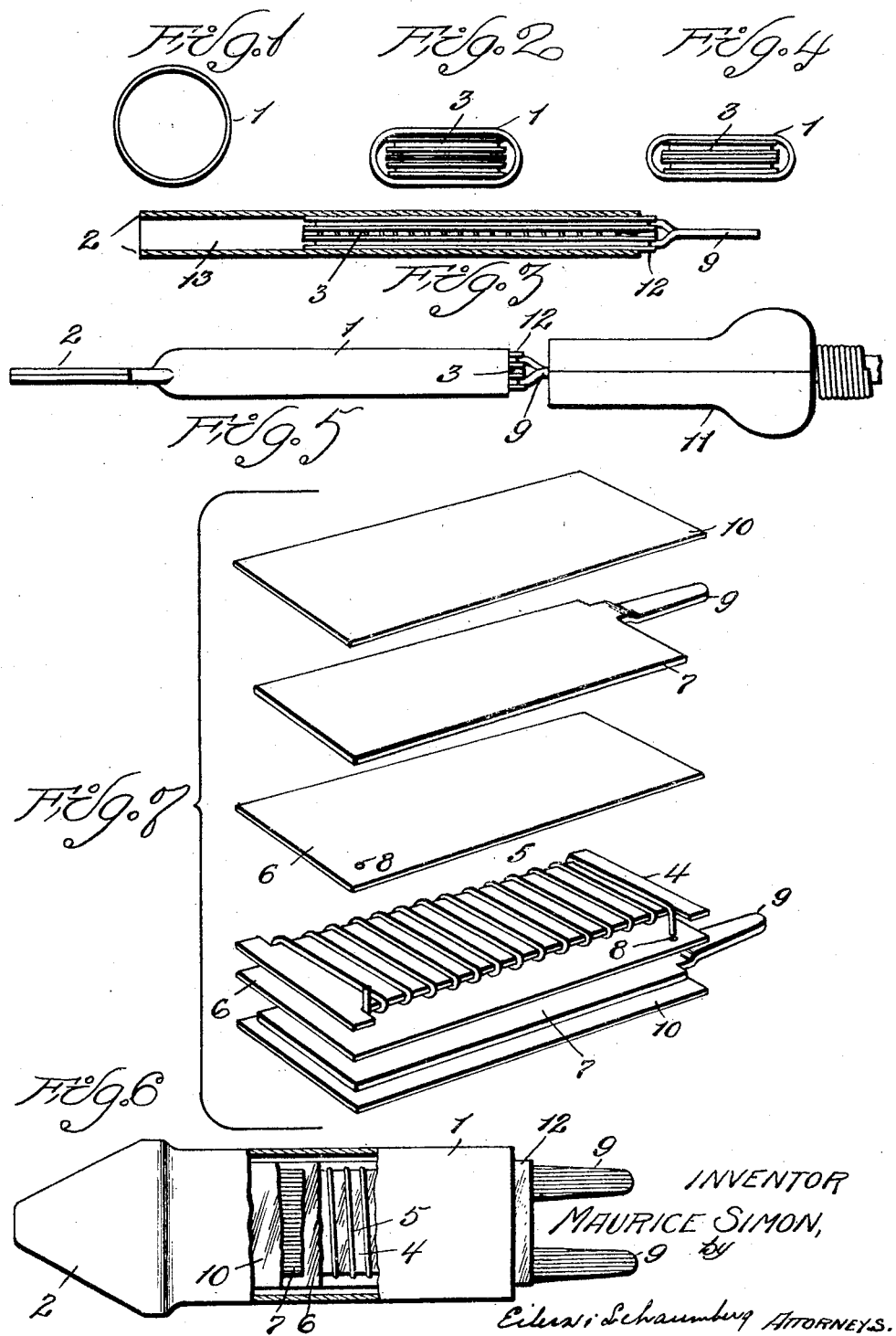

1,520,913

UNITED STATES PATENT OFFICE.

MAURICE SIMON, OF ST. LOUIS, MISSOURI, ASSIGNOR TO BEEHLER STEEL PRODUCTS COMPANY, OF ST. LOUIS, MISSOURI, A CORPORATION OF MISSOURI.

ELECTRIC SOLDERING IRON AND METHOD OF MAKING THE SAME.

Application filed October 16, 1922. Serial No. 595,006.

*To all whom it may concern:*

Be it known that I, MAURICE SIMON, residing in the city of St. Louis and State of Missouri, have invented a certain new and useful Electric Soldering Iron and Method of Making the Same, of which the following is a full, clear, and exact description, such as will enable others skilled in the art to make and use the same.

My invention relates to electric soldering irons and consists in the novel construction, arrangement, and combination of parts hereinafter fully described.

The object of my invention is to construct, as a complete article of commerce, a soldering-iron having a built-in heating unit carrying means for ready electrical connection with standard electrical devices and fixtures.

A further object of my invention is to provide an electric soldering iron which is simple, efficient, and so inexpensive in character as to bring the device entirely within the reach and means of those heretofore financially incapable of possessing one.

A still further object of my invention is to provide an electric soldering iron which may be used in connection with a standard heating device plug for a handle, thus eliminating the necessity and expense of furnishing, therewith, the usually affixed handle and its accessories.

My invention further relates to a method of making electric soldering irons which consists in producing an efficient, durable and practical device with a minimum of labor and material thus resulting in a very inexpensive product.

With these and other objects in view, I shall now describe my electric soldering iron and the method I use in manufacturing same; and, in this connection, I desire to state that various changes may be made in the design and structure of my device and in the method of constructing same without departing form the spirit and scope of my invention.

In the accompanying drawings Fig. 1 is a cross section of the tubular case such as may be employed in the construction of my device, and Fig. 2 shows such a case after the same has been partially flattened and a heating element inserted therein. Fig. 3 is a longitudinal section of my device showing the same before a soldering tip has been formed, and Fig. 4 is a cross sectional view showing a tubular portion compressed about the heating element. Fig. 5 is a side elevation of my soldering iron, showing a standard heating device plug fitted to it to serve as a handle. Fig. 6 is a top plan view, partially cut away, showing the heating element within the casing and the insulating arrangement. Fig. 7 is a perspective view of a heating element showing the unassembled parts which enter into its construction.

Referring to the drawings, 1 is a metal tube, preferably of copper, which forms the jacket of my soldering iron and also the soldering tip 2. 3 is a flat insulated resistor, best shown in Fig. 7, which is inserted in said tube and by means of which the necessary heat is provided for operating my device.

The heating element is preferably made of a sheet of insulating material, 4, preferably mica, on which a resistance wire 5 is wound; and sheets of insulating material 6, preferably mica, used to insulate the winding from the terminal plates 7. These sheets 6 preferably have openings 8 therein, through which the resistance wire 5 is passed in order to make connection with a source of supply as through the terminal plates 7. These plates are preferably made of metal and have projecting portions 9 adapted to form terminals for connecting the soldering iron to a source of heat supply and preferably shaped for ready insertion in a standard heating device plug. 10 are sheets of insulating material, preferably mica, used to insulate the terminal plates 7, or other electrical connection, from the metallic jacket 1, above described.

2 is a soldering tip preferably formed by flattening the unfilled portion of the metal tube 1 and shaping it, preferably, as shown in Fig. 6. 11 is a standard heating device plug which may be used as a handle for operating my device, in place of the conventional handle, and to connect it with a source of electrical energy.

In the manufacture of my device I prefer to use a tubular casing 1 of suitable length and preferably of copper, and which casing is preferably circular in cross section, as shown in Fig. 1. This tubing is then flattened and an insulated resistor 3 inserted therein as shown in Fig. 3. I prefer to leave a portion 12 of the insulation of the resistor protrude from one end of the tube so that, when the device is completed, this insulation will prevent short circuiting between the terminals 9 and the casing 1. By preference, the resistor is inserted in the tube to a predetermined point leaving a portion 13 which may subsequently be formed into a soldering tip 2 as hereinafter more clearly described. After the resistor has been positioned in a tube the tube is compressed, thus fixing the insulated resistor rigidly in position and providing the necessary thermal contact between the heating element 3 and jacket 1 of the soldering iron. The unfilled end 13 of the tubular case is then compressed so that the opposing walls are brought together and preferably in contact in order to form a soldering tip. The corners are then removed in any suitable manner so as to give the tip a more convenient and workable shape. The resultant seam may be closed or sealed in any suitable manner such as brazing or welding.

An electric soldering iron thus produced constitutes an exceedingly simple and efficient device and may be very economically constructed on account of the integral arrangement of the soldering tip and heating jacket, by which arrangement many unnecessary operations are eliminated. It also makes a more economical iron to operate because the heat is conducted almost instantly to the soldering tip with little or no loss.

I claim:

1. A device of the class described, constructed as a complete article of manufacture, comprising an electrical heating element and means for readily connecting and disconnecting the heating element with detachable companion means connected with a source of electrical energy.

2. A device of the class described constructed as a complete article of manufacture, comprising an electrical heating element, a jacket therefor, and means for electrically and mechanically connecting the device with a detachable holding or manipulative element and with a source of electrical energy.

3. As a new article of manufacture, a soldering iron comprising a jacket and a soldering tip, an electrical heater for insertion in the jacket and rigid elements electrically connected with the heater to serve as a mechanical connection with a detachable holding or manipulative element.

4. As a new article of manufacture, a soldering iron comprising an electrical heater, a unitary element forming an envelope for the heater and a soldering tip, and means, electrically connected with the heater, constructed to serve as a mechanical connection for the article, as a whole, with a detachable holding means.

5. As a new article of manufacture, a soldering iron comprising a jacket and a tip, a heating element within the jacket and means forming a mechanical connection for the article, as a whole, with a detachable holding means and a readily connecting and disconnecting means with a source of electrical energy.

6. As a new article of manufacture, a soldering iron, comprising a jacket and a soldering tip formed as a unitary element, an electrical heater for insertion within the jacket and rigid terminals for the heater for electrically and mechanically connecting the article, as a whole, with a detachable holding or manipulative element and with a source of electrical energy.

7. As a new article of manufacture, a soldering iron, comprising a jacket and soldering tip formed as a unitary element, an electrical heater for insertion within the jacket, and rigid terminals for the heater for electrically and mechanically connecting the article, as a whole, with a detachable holding or manipulative element connected with a source of electrical energy.

8. As a new article of manufacture, a soldering iron comprising a jacket and a tip, a heating element within the jacket and means for mechanically connecting the article, as a whole, with a detachable holding means and for readily connecting and disconnecting the article with a source of electrical energy.

9. As a new article of manufacture, a soldering iron comprising a hollow body, a soldering tip integral with said body, and an electrical heater for insertion within the body comprising a resistor unit, a pair of rigid plates electrically connected with the resistor unit and integral terminals carried by said plates whereby the article, as a whole, may be readily, mechanically and electrically connected with a detachable holding or manipulative device connected with a source of energy.

10. As a new article of manufacture, a soldering iron comprising a tubiform body constructed of material of high heat conductivity, a soldering tip formed integral with said body, an electrical heater comprising a resistor unit and elements forming rigid electrical terminals for the resistor unit, whereby the article, as a whole, may be readily, electrically and mechanically connected with a detachable holding means having connection with a source of electrical energy.

11. As a new article of manufacture, a soldering iron comprising a tubiform body, a resistor unit for residence in a portion of said body, a soldering tip formed of the unoccupied portion of the body, and rigid elements, electrically connected with the resistor unit for synchronous electrical and mechanical connection with a detachable holding element having connection with a source of electrical energy.

12. As a new article of manufacture, a soldering iron, comprising a tubiform body, a resistor winding, and a pair of plates for residence in said body, each of said plates having a rigid terminal, means for insulating the winding, plates and tubiform body relatively, and a soldering tip shaped out of the portion of the tubiform body unoccupied by said winding and plates, said tip and body being constructed of relatively high heat conducting material.

13. The herein described method of making a soldering iron which consists in taking a flexible tubiform, in securing a heating element within a portion of the length of the tubiform and in shaping the unoccupied portion of the tubiform to form a soldering tip.

14. The herein described method of making a soldering iron which consists in taking a flexible tubiform, in inserting a heating unit in a portion of the length of the tubiform, in compressing the tubiform upon the heating unit for the retention thereof and in shaping the unoccupied portion of the tubiform to form a soldering tip.

15. The herein described method of making a soldering iron which consists in taking a length of seamless tubing having a substantially circular section and constructed of material having relatively high heat conductivity, in shaping said length to an oblong section, in securing a heating element in a portion of said shaped length and in shaping the unoccupied portion to form a soldering tip.

16. In an electric soldering iron, an external flexible, metallic element adapted to fit about an electrical resistor, which element serves as a protective sheath and soldering tip.

17. In a flat electrical soldering iron, an external flexible, metallic element adapted to fit about an electrical resistor, which element serves as a protective sheath and soldering tip.

18. In an electric soldering iron, a heating resistor, insulation about said resistor, and an external flexible, conducting jacket enclosing said resistor and insulation, said jacket having a soldering tip integral therewith.

19. In an electric soldering iron, a heating resistor, insulation about said resistor, and an external flat, protective, conducting jacket enclosing said resistor and insulation and having a soldering tip integral therewith.

20. In an electric soldering iron, an external flat, conducting jacket enclosing a flat, heating resistor, insulation between the jacket and the resistor and a soldering tip integral with said jacket.

21. In an electric soldering iron, a heating resistor, and an external, flexible jacket about said resistor, said jacket having means integral therewith for maintaining it in thermal contact with said resistor.

MAURICE SIMON.